United States Patent

[11] 3,587,995

| [72] | Inventor | John S. Haddock |
| | | 2646 E. 34th St., Tulsa, Okla. 74105 |
| [21] | Appl. No. | 848,886 |
| [22] | Filed | Aug. 11, 1969 |
| [45] | Patented | June 28, 1971 |

[54] LINE APPLICATOR FOR SPINNING AND SPIN CAST REELS
8 Claims, 5 Drawing Figs.

[52] U.S. Cl. .................................................. 242/84.2, 242/136
[51] Int. Cl. ................................................ A01k 89/00
[50] Field of Search .......................................... 242/84.1, 84.2, 84.21, 85, 104, 136, 134, 129.6, 68.3

[56] References Cited
UNITED STATES PATENTS

| 2,084,251 | 6/1937 | Haislip ........................... | 242/104X |
| 3,261,569 | 7/1966 | Bedell ............................ | 242/136 |
| 3,312,418 | 4/1967 | Haddock ......................... | 242/85 |

*Primary Examiner*—Billy S. Taylor
*Attorney*—Head & Johnson

ABSTRACT: An apparatus for applying line without twist onto fishing reels has a frame which carries a spindle for receiving bulk fishing line spools and is releasably coupled to the pickup cylinder of a fishing reel. Each of the legs has an offset base which is received on the frame in such a manner that rotation of the legs effects a circular outline of varying diameter at the terminal ends of the legs to enable one apparatus to be attached to various size pickup cylinders.

PATENTED JUN 28 1971 3,587,995

INVENTOR.
JOHN S. HADDOCK
BY
Head & Johnson
ATTORNEYS

LINE APPLICATOR FOR SPINNING AND SPIN CAST REELS

BACKGROUND OF THE INVENTION

This invention relates to an apparatus for applying line onto fishing reels and is an improvement over U.S. Pat. No. 3,312,418. In the loading of monofilament line typically used with spinning reels from a bulk spool onto a spinning reel, the line must be convoluted upon the reel spool without being twisted in order to eliminate the possibility of the line becoming tangled when cast resulting in what is commonly known as a "bird nest" In the past the spinning reel was loaded from bulk spools by placing the reel spool upon an arbor connected to a motor wherein the axis of a reel spool was parallel to the axis of the bulk line spool. This method had two distinct disadvantages. First, the application invariably placed the line on a spool unevenly during transfer since it was necessary that the line be guided manually. Secondly, the reel spool had to be removed from the reel. In the fishing line applicator as discussed in the aforementioned patent, these disadvantages were overcome by providing an apparatus which operated conjointly with the revolving pickup cylinders and wherein the bulk spool was adapted to rotate about an axis perpendicular to the axis of the reel spool. In the above-mentioned patent a different line applicator apparatus was necessary for each size spinning reel pickup head and each size bulk spool; thus a fisherman would have to buy a line applicator apparatus for each reel he owned and also for each size bulk spool he wished to use The present invention permits the use of the same line applicator apparatus for different size spinning reels and also the different size bulk spools; hence the fisherman need only have one applicator to fulfill all his needs.

SUMMARY OF THE INVENTION

Generally this invention provides a frame which supports a spindle for receiving bulk fishing line spools and which is releasably coupled by legs to a pickup cylinder of a fishing reel. As used herein, the term "bulk spool" shall mean line which is on spools of any quantity. Each of the legs has a base offset from its main axis which includes a polygon-shaped protrusion insertable into one of the polygon-shaped cavities located on the frame. On the terminal end of each of the legs there is means for frictional attachment to the pickup of the fishing reel. By the rotation and positioning of the legs into the polygon-shaped cavities a circular outline of varying diameter is formed at the terminal ends of the legs thereby enabling the device to be attached to various size pickup cylinder heads.

DESCRIPTION OF THE PREFERRED EMBODIMENT

Figure 1:
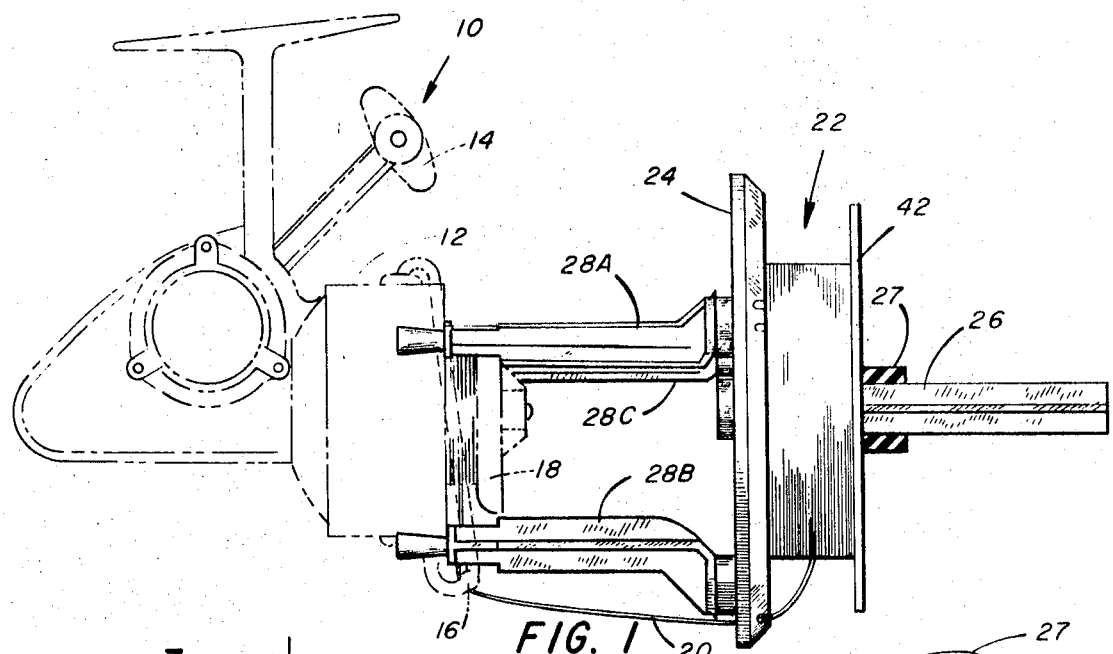
FIG. 1 is an elevational view showing the apparatus attached to a fishing reel.

In describing the preferred embodiment of the invention illustrated in the drawings, specific terminology will be used for the sake of clarity. However, it is not intended to be limited to the specific term so selected, and it is to be understood that each specific term includes all technical equivalents which operate in a similar manner to accomplish a similar purpose.

Referring now to FIG. 1, the number 10 generally denotes a spinning reel of the type having a revolving pickup cylinder 12 which is rotated by means of crank 14. Attached to the revolving pickup cylinder is a fishing line pickup guide pin 16 which changes direction of the line 20 as it is drawn onto stationary spool 18. The fish line applicator apparatus 22 is basically composed of a frame 24, a spindle 26 and at least three legs 28A, 28B and 28C. Bulk spool 42 rides on spindle 26. In some instances a grommet or keeper 27 of rubber or plastic is slipped over the spindle 26 to retain the spool to prevent the bulk or line spool from dropping or sliding off the spindle. In some instances the keeper is used to adjust line tension by more or less pressure against the bulk spool.

Figure 2:
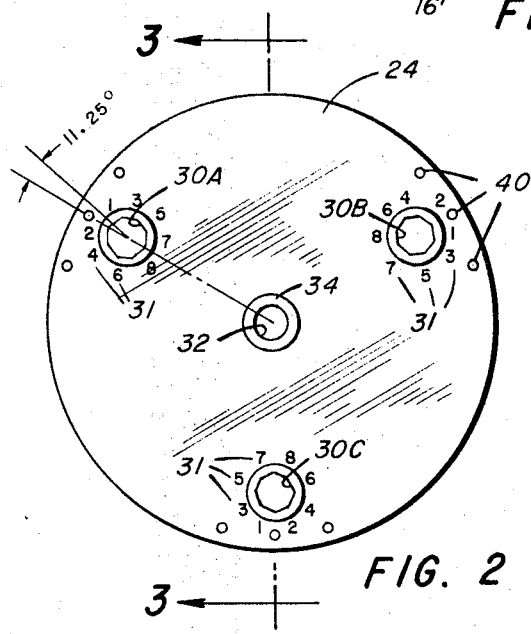
FIG. 2 is an end elevation view.
Figure 3:
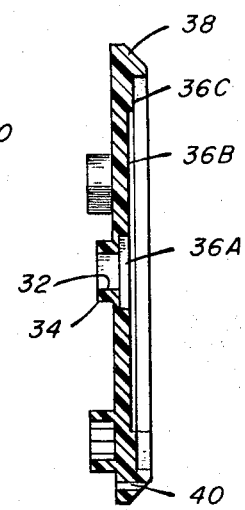
FIG. 3 is a view in section taken as indicated by the lines 3-3 of FIG. 2.

Looking at FIGS. 2 and 3, the frame 24 is a circular disc having a central opening 32 encircled by boss 34. On the side facing the fishing reel, or rearward side, there are a plurality of mutually equidistant octagon-shaped cavities 30A, 30B and 30C; each of these cavities has been rotated 11.25° off that axis which radiates outwardly from the center of said disc passing through the center of the octagon and either passing through one of the corners of said octagon or passing perpendicularly through the sides of said octagon. Each side of each of the octagon-shaped cavities has been given an indicating symbol 31; corresponding sides have identical symbols as shown in the drawings.

The forward side of frame 24 contains annular surfaces 36A, 36B and 36C which are concentric about said central opening 32 and arranged in such a manner that 36A is recessed in relation to 36B, and 36B is recessed in relation to 36C. Annular surface 36C is bounded by a raised rim 38 which is beveled in an outwardly and downwardly manner. A plurality of apertures 40 are located at spaced intervals around the periphery of said rim 38.

Figure 4:
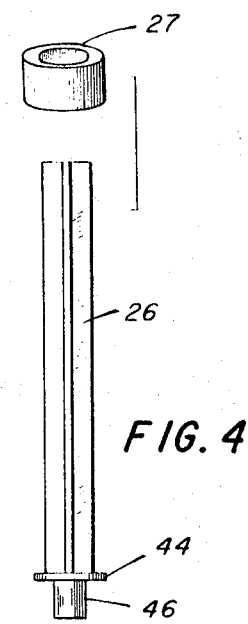
FIG. 4 shows a spindle of this invention.

Spindle 26, used to receive the bulk spools 42, terminates at one end with a flange 44 perpendicular to its longitudinal axis and a solid cylinder 46 as shown in FIG. 4. The cylinder is frictionally retainable in opening 32.

Figure 5:
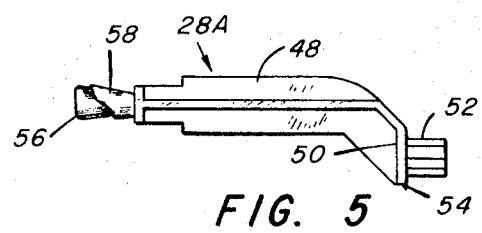
FIG. 5 illustrates one of the legs used in this invention.

FIG. 5 depicts one of the identical legs 28A, 28B and 28C. Each of these legs consists of a longitudinal attachment portion 48 having at one end a base 50 offset from the longitudinal attachment axis. An octagon-shaped protrusion 52 extends from the offset and is frictionally retainable in any one cavity 30A, 30B or 30C. At the rearward end is a tapered stud 56 covered by a latex sleeve 58. An indicator 54 extends outwardly from the base 50.

In the operation of applying fishing line 20 from a spool 42 the spindle 26 is attached to frame 24 by the slidable insertion of cylinder 46 into the central opening 32 in such a manner that flange 44 is within recess 36A and flush with surface 36B. The legs 28A, 28B and 28C are selectively engaged to frame 24 by the insertion of protrusions 52 into the octagon-shaped cavities 30A, 30B and 30C in such a manner that each indicator 54 points to a like symbol 31. The legs 28A, 28B and 28C are selectively engaged to frame 24 by the insertion of protrusions 52 into the octagon-shaped cavities 30A, 30B and 30C in such a manner that each indicator 54 points to a like symbol 31. The legs 28A, 28B and 28C, so engaged, extend from the frame 24 rearwardly to form at their terminal ends a circular outline about a central axis of a diameter approximately equal to the diameter of the pickup cylinder 16 of the chosen size reel 10. The apparatus 22 is then clamped to the pickup cylinder 16 and held thereon either frictionally by the rubber latex sleeves 58 or by the resiliency of the legs. In some instances stud 56 is tapered forwardly inwardly for greater surface contact with the pickup cylinder 16. The bulk spool 42 is then inserted onto the spindle 26 through a central hole and rides on surface 36C which gives the proper line tension for this size spool. The line 20 is then threaded from bulk spool 42 through the most convenient aperture 40 past guide 16 and then onto the stationary spinning reel spool 18. By the simultaneous rotation of the pickup cylinder 12 and the apparatus 22, the line 20 is convoluted onto the stationary reel spool 18 the same as it comes off the bulk spool without being twisted. After all the line 20, deemed necessary by the fisherman, has been wound onto the stationary reel spool 18 the apparatus is removed.

When the apparatus is to be used with a reel with a different size diameter pickup cylinder 12, the legs are disengaged from their original positions, rotated and reengaged in new positions so that the diameter of their circular outline becomes slightly smaller than the diameter of this different pickup cylinder 12. As before, the indicator 54 on each of the legs 28A, 28B and 28C must point to like symbols 31.

For larger, i.e., ¼-pound bulk spools 42, the spindle 26 is inserted into the central opening 32 in such a manner that the forward surface of flange 44 is above the surface 36B. This permits the spool 42 to ride on the top surface of paten 46 thereby relieving tension from the line and allowing the spool to evolve easier. Bulk spools 42 that have a diameter larger than the surface 36C ride on the rim 38. Due to the beveling of this rim the line is not pinched as it comes off the bulk spool 42 and threads through aperture 40.

The advantage of this apparatus is that it enables a man to have one device applicable to all types of reels, up to large slat water types, which have different size pickup cylinders and line from different size bulk spools. Although an open face spinning reel is shown it is to be understood that the line winder of this invention is applicable to closed face spinning reels such as those sold under the trademark "Zebco" and others. In some instances a strap of "Velcro" material may be used, encircling the legs 28A, 28B and 28C to retain the device in its position on pickup cylinders that, for example, do not allow sufficient gripping engagement.

I claim:

1. A device adaptable to different size reels for transferring fishing line from a bulk spool onto a stationary spinning reel spool of the type using a pickup cylinder revolvable coaxially about said spool comprising:

a frame;

a plurality of mutually equidistant cavities on one side of said frame;

a plurality of leg members for each cavity;

each leg having a protrusion offset from the longitudinal axis of said leg;

said protrusion frictionally retainable in said cavity whereby said legs extend rearwardly from said frame aggregatively forming at their terminal ends a circular outline about a first axis coincident with and for attachment to said pickup cylinder for rotation therewith, the diameter of said circular outline being varied by the synchronous rotation of said legs within said cavities; and a spindle for said bulk spool, extending forwardly from said frame along a second axis generally parallel to or the same as said first axis.

2. A device as in claim 1 wherein:

said frame is a circular disc having a central opening;

said plurality of mutually equidistant cavities are octagon-shaped, each of said octagon-shaped cavities being positioned relative to a radial axis from said central opening and through the center of said cavity, said axis passing neither perpendicularly through one of the sides of said cavity nor passing through a junction of two of the sides of said cavity; and each of said protrusions on said legs being octagon in shape for selective engagement with said cavity in a first position;

the diameter of said circular outline being varied by the synchronous engagement of each protrusion in each of said cavities in a correlative second position.

3. A device of claim 2 wherein:

said radial axis passes either perpendicular through one of the sides of said cavity or through a junction of two of the sides of said cavity.

4. An apparatus as in claim 2 wherein said spindle for receiving of bulk spools is slidably disposed in said central opening, said spindle having near its base a flange surface upon which bulk spools can ride.

5. An apparatus of claim 2 wherein the forward side of said frame carrying said spindle has a plurality of surfaces of diverse diameters concentric about said central opening and arranged in such a manner that progressing outwardly from said central opening each preceding surface is recessed in relation to the one following; the outermost surface being bounded by a raised rim which is beveled outwardly and downwardly; and said rim containing a plurality of apertures.

6. An apparatus of claim 3 wherein the forward side of said frame carrying said spindle has a plurality of surfaces of diverse diameters concentric about said central opening and arranged in such a manner that progressing outwardly from said central opening each preceding surface is recessed in relation to the one following; the outermost surface being bounded by a raised rim which is beveled outwardly and downwardly; and said rim containing a plurality of apertures.

7. An apparatus of claim 4 wherein the forward side of said frame carrying said spindle has a plurality of surfaces of diverse diameters concentric about said central opening and arranged in such a manner that progressing outwardly from said central opening each preceding surface is recessed in relation to the one following; the outermost surface being bounded by a raised rim which is beveled outwardly and downwardly; and said rim containing a plurality of apertures.

8. An apparatus as in claim 2 wherein said apparatus incorporates position indicating means.